May 22, 1945.  C. DUCHAUSSOY  2,376,673
MECHANISM FOR TRANSMITTING MOTION
Filed April 11, 1940  7 Sheets-Sheet 2
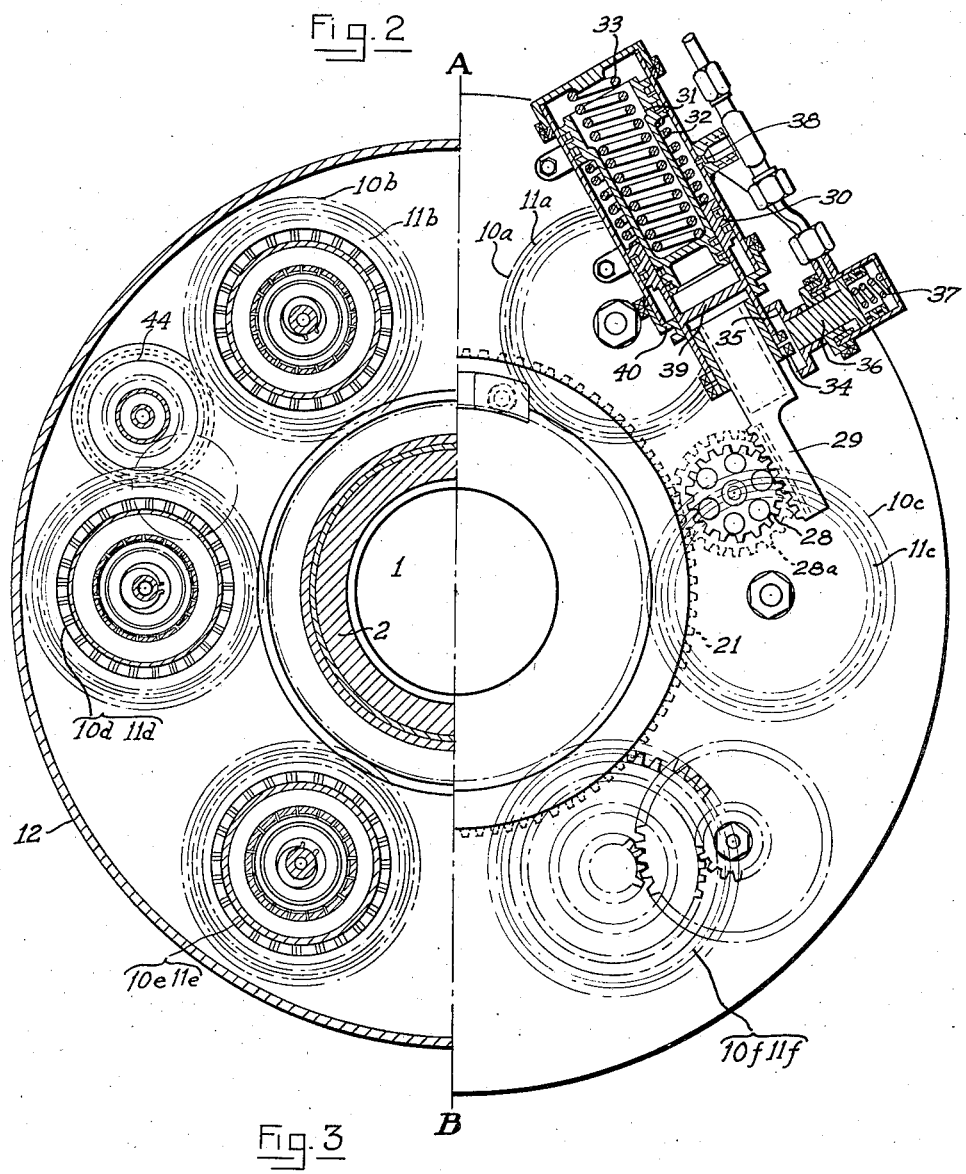
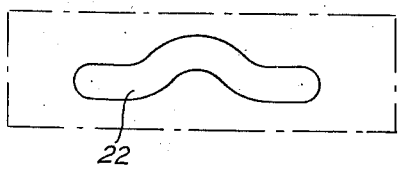
Inventor
CAMILLE DUCHAUSSOY
By Attorney.

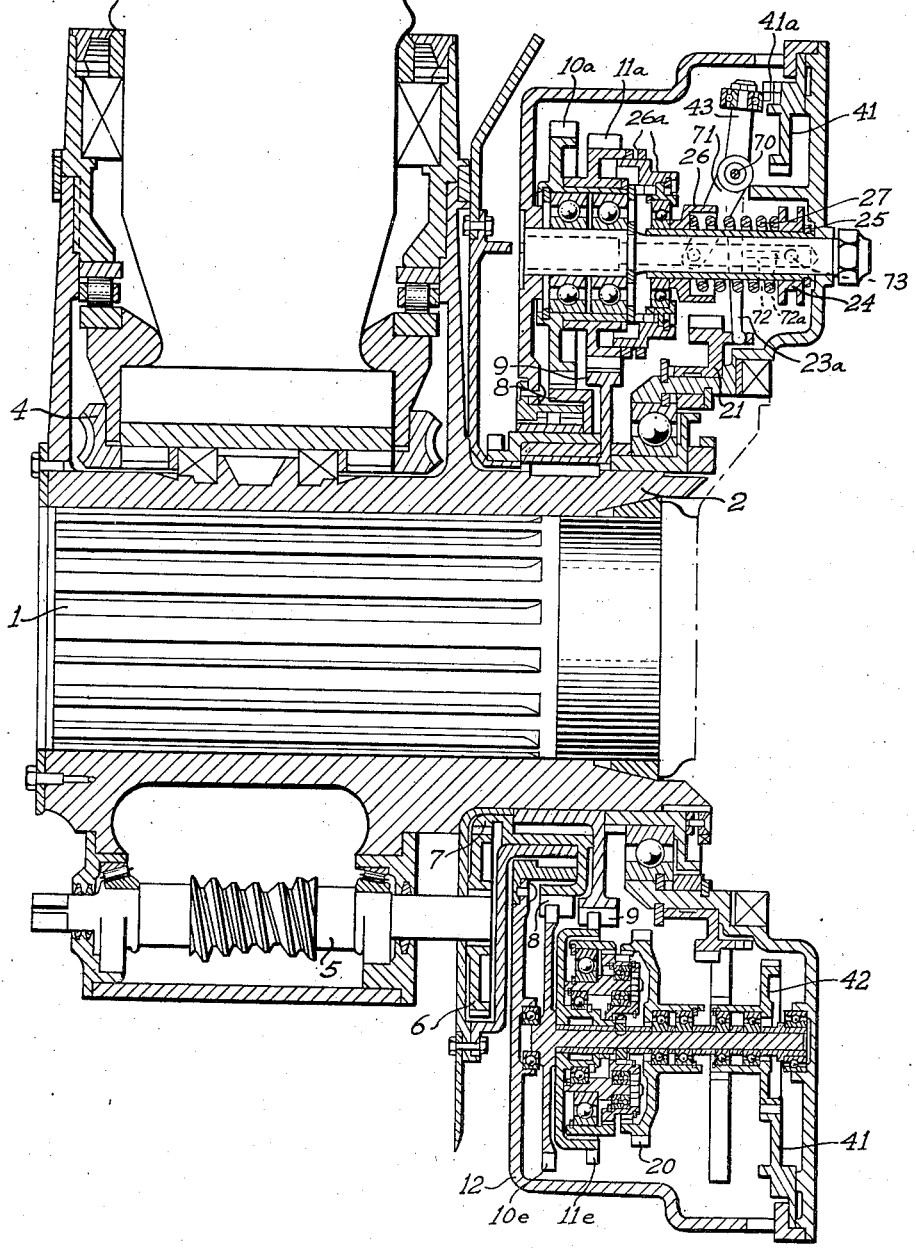

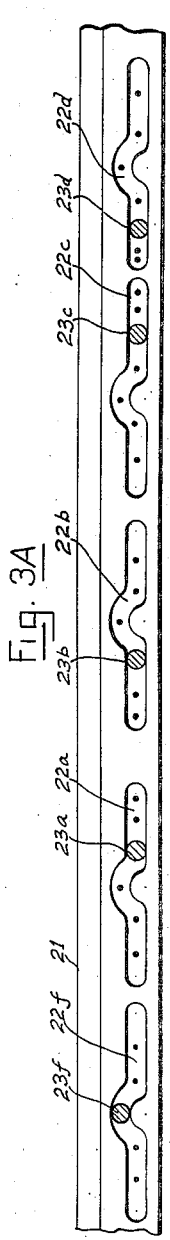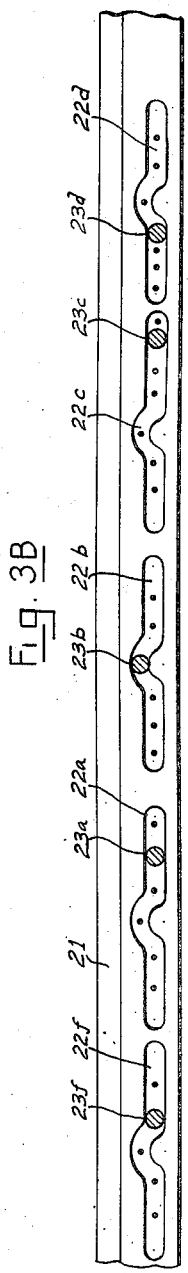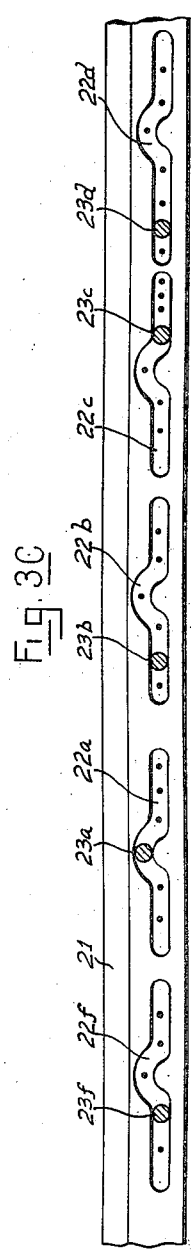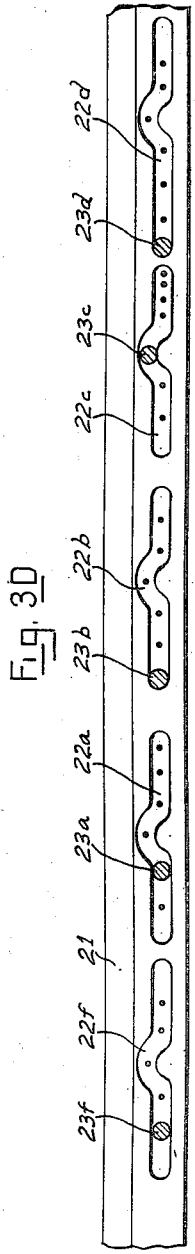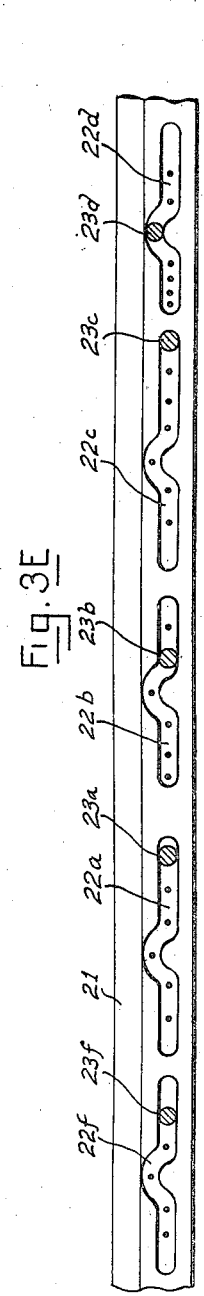

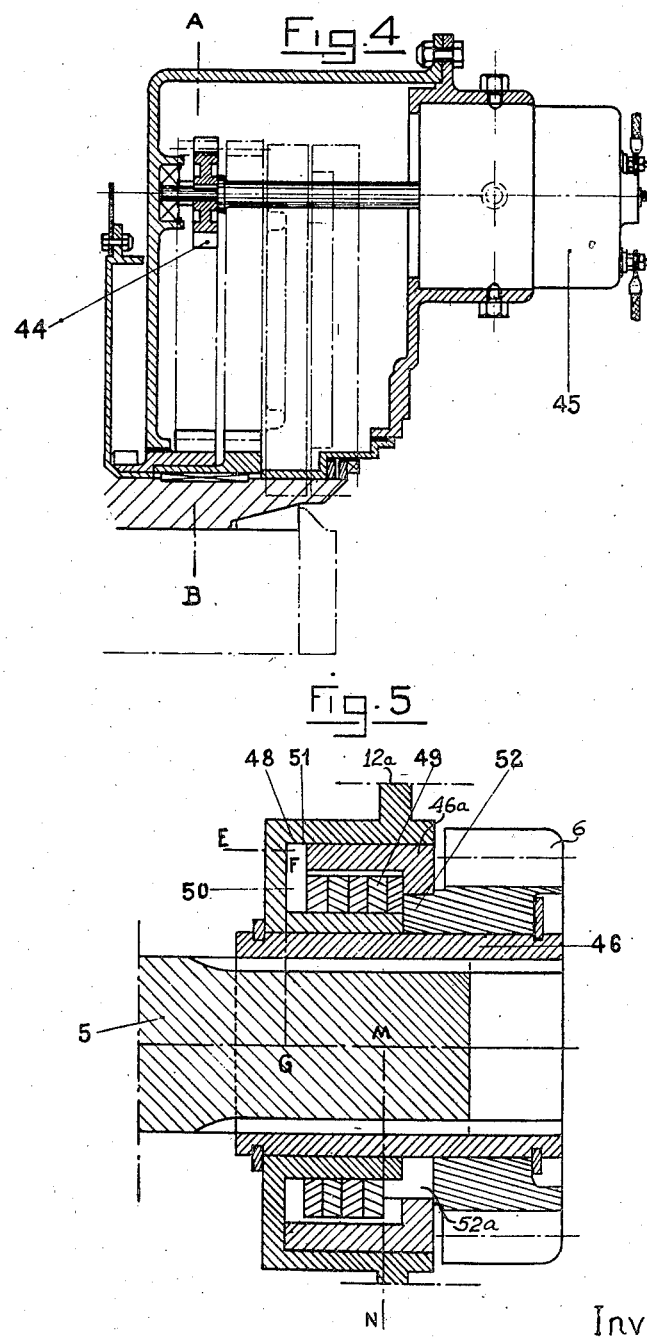

Inventor
CAMILLE DUCHAUSSOY
By *Attorney.*

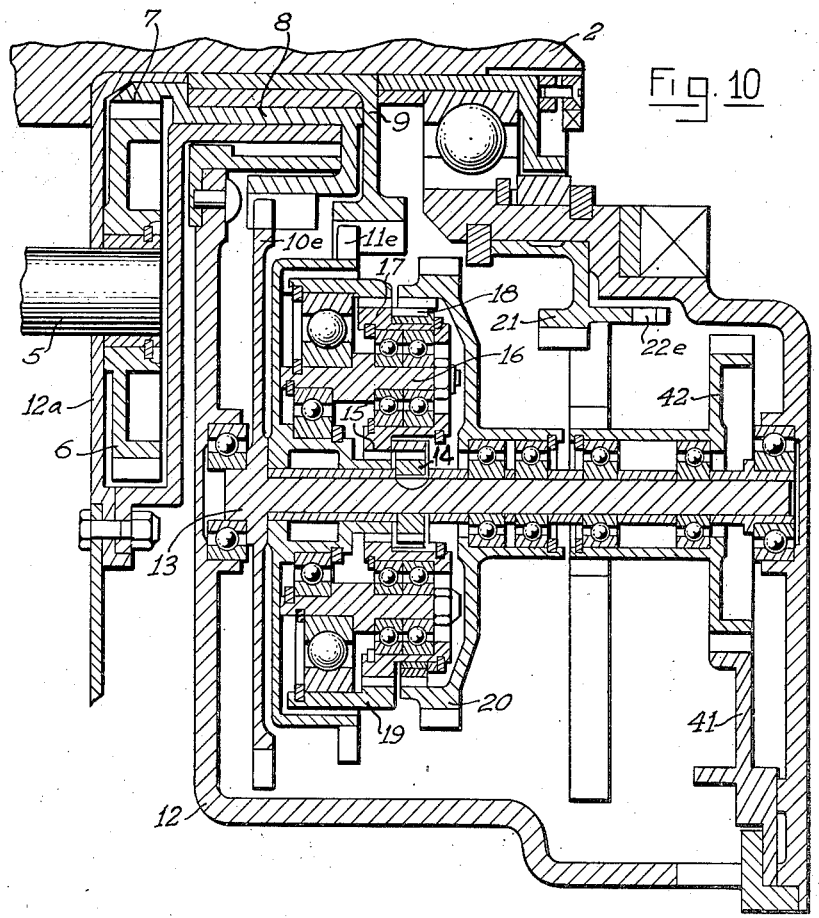
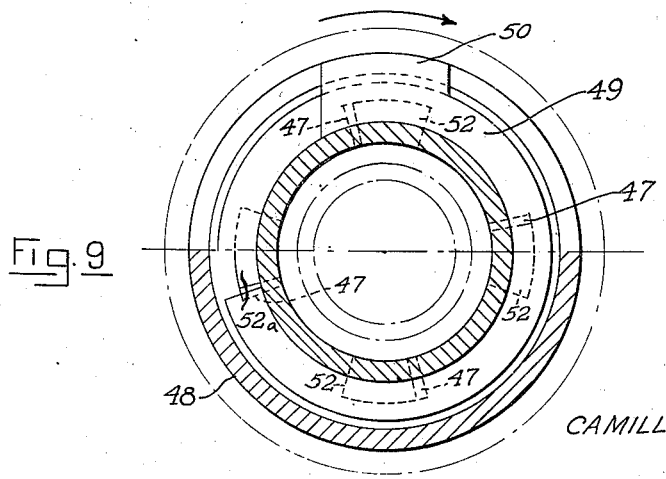

May 22, 1945.  C. DUCHAUSSOY  2,376,673
MECHANISM FOR TRANSMITTING MOTION
Filed April 11, 1940  7 Sheets-Sheet 7
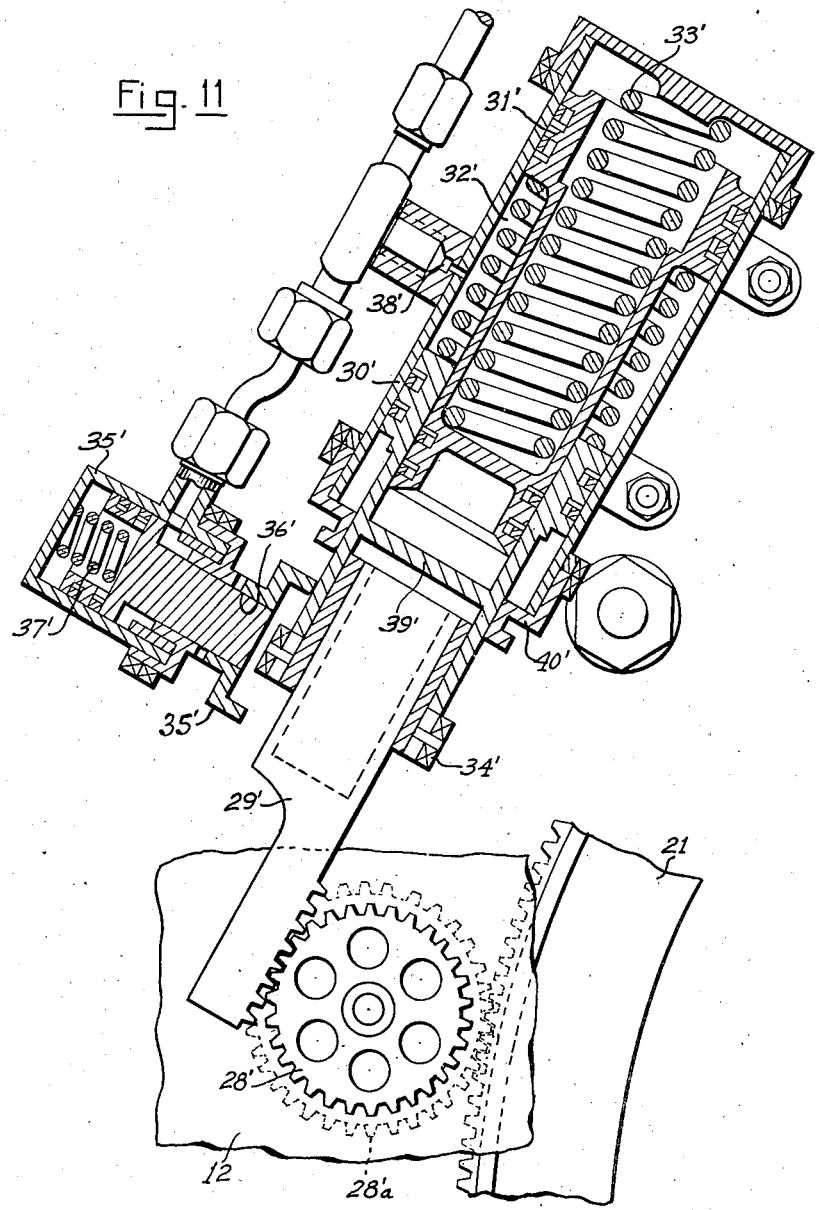
Inventor
CAMILLE DUCHAUSSOY

Patented May 22, 1945

2,376,673

UNITED STATES PATENT OFFICE 2,376,673

MECHANISM FOR TRANSMITTING MOTION

Camille Duchaussoy, Charenton, France; vested in the Alien Property Custodian

Application April 11, 1940, Serial No. 329,155
In France April 19, 1939

5 Claims. (Cl. 170—163)

This invention relates to motion transmitting mechanisms, and more particularly to a motion transmitting mechanism comprising speed changing means, and as accessories an irreversibility or blade pitch locking device, a selective speed initiating and stopping means, and means for limiting the period of operation, adjustable as desired.

The invention is concerned more particularly with the application of these different means for controlling the change of pitch of the blades of a variable pitch propeller, said invention being of especial interest in this connection.

It is a matter of common knowledge that in order to use an aircraft motor or engine to the best advantage it is customary to vary the adjustment of the pitch of the propeller blades during flight. In view of the very considerable inertia possessed by the propeller this adjustment should as a general rule be effected slowly in order to avoid suction phenomena. On the other hand certain special operations should be effected very rapidly as distinguished from operations effected under normal flying conditions. For example, to damp or brake in diving, the pitch of the blades must be quickly reversed, while to reduce the resistance to progress in case of engine failure the blades must be fully feathered quickly. These different conditions call for the use of means for changing the speed which shall enable the pitch of the blades to be changed slowly or rapidly.

Another object of the invention is to provide in speed varying means, comprising reducing means consisting of a gear connected to the driving shaft, a wheel coaxial with said shaft and connected to the organ to be driven, a set of coaxial pinions which may be united as one and each meshing with one of said wheels, the arrangement of as many suitable sets of pinions about said wheels as there are different speeds to be provided for or as the dimensions of said wheels and pinions permit.

The invention and its aforesaid aims and objects, as well as such others as may hereinafter appear, will be clearly understood from the following description, taken in connection with the accompanying drawing of embodiments of the invention herein given for illustrative purposes, the true scope of the invention being pointed out in the appended claims.

In the drawing:

Fig. 1 is a side view partially in section of the blade pitch control, the lower portion of said figure showing a differential blade pitch indicator;

Fig. 2 is a front view, partially in section, of the speed changing means pertaining to the blade pitch control;

Fig. 3 is a detail of one of the cam slots provided in a gear wheel provided in the blade pitch control;

Figure 6:
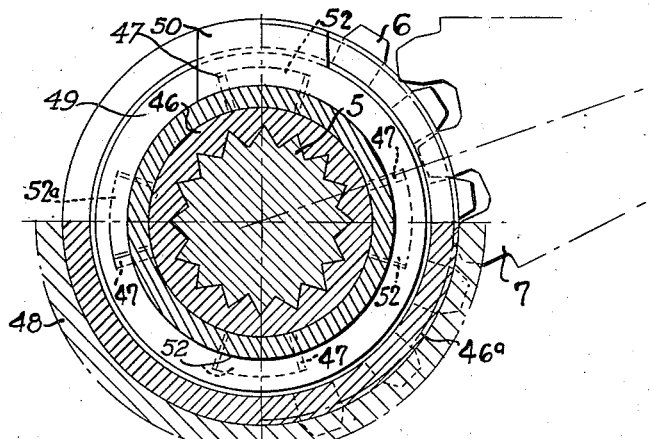
Figure 7:
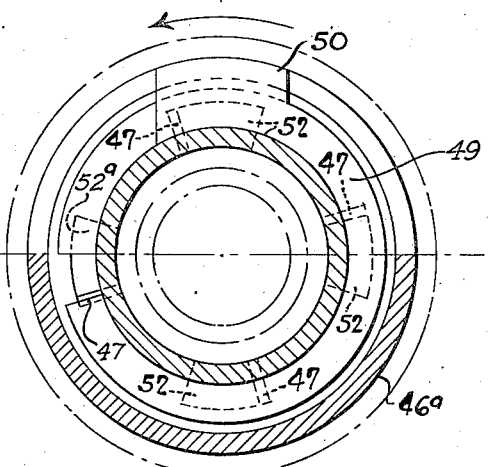

Figs. 3A to 3E inclusive are schematic developed views of a portion of the gear and associated cam slot ring, each of said figures illustrating a different position of the cam slot assembly relative to the several clutch levers operated thereby;

Fig. 4 is a view, partly in section, of auxiliary electric means enabling the blade pitch control for fully feathering the blades, to be controlled or operated by an auxiliary motor;

Figs. 5, 6, 7, 8 and 9 are different views of irreversibility or blade pitch locking means pertaining to the blade pitch control, and Fig. 10 shows the lower part of Fig. 1 on an enlarged scale.

Fig. 11 shows the driving means for the left-hand portion of Fig. 2.

The illustrative embodiment of the speed changing control shown in Figs. 1 and 2, comprises a driving shaft 1 and a hub 2 splined thereon and carrying blades 3, gears 4 for controlling said blades, and worms 5 for controlling said gears, said worms being driven by pinions 6 meshing with a toothed gear 7 integral with a gear 8 (see Fig. 10). Said toothed gear 7 and gear 8 are adapted to rotate loosely as a unit upon a gear 9 which is integral with hub 2. (See Fig. 1.) In accordance with the invention sets of pinions 10a, 11a, 10b, 11b, 10c, 11c, 10d, 11d, and 10f, 11f, are disposed about said gears 8 and 9. Said pinions are carried upon spindles mounted in a housing 12 and may be brought into mesh with one another by any suitable means, in the present instance by mechanical clutches. By varying the number of teeth of said pinions the gear transmission ratio may be varied within quite wide limits. It has been established that the number of the teeth of the pinions which mesh with said gears may be varied within quite large proportions while still remaining within acceptable limits for the modification of the moduli or of errors in the spacing of the spindles.

In the illustrative embodiment of the invention shown in Figs. 1 and 2 there are six sets of pinions as follows:

A set of pinions 10a, 11a each having a number of teeth such that if both be thrown into gear, the pinions of the other sets being out of gear, gear 8 will rotate slightly faster than gear 9. This is the set of pinions for slowly increasing the blade pitch;

A set of pinions 10b, 11b having a number of teeth such that gear 8 will rotate slightly slower than gear 9 when said pinions are thrown into gear, the pinions of the other sets being out of gear. This is the set of pinions for slowly reducing the blade pitch;

A set of pinions 10c, 11c having a number of teeth such that when said pinions are in gear, those of the other sets being out of gear, said gear 8 will rotate much more quickly than gear 9. This is the set of pinions for quickly increasing the blade pitch;

A set of pinions 10d, 11d having a number of teeth such that when said pinions are in gear, the other sets being out of gear, said gear 8 will rotate much less rapidly than said gear 9. This is the set of pinions for quickly reducing the blade pitch;

A set of pinions 10e, 11e, also forming part of the invention, but having a different function from those above referred to. The number of teeth of this set is such that when said pinions rotate at the same speed, gears 8 and 9 also rotate at the same speed. Referring to Fig. 10, pinion 10e is rigidly connected to a spindle or shaft 13 upon which is splined a pinion 14. Pinion 11e is rigidly connected to a pinion 15 having the same number of teeth as said pinion 14. A system of satellite pinions is mounted upon a planetary carrier shaft 16, which shaft is loosely mounted relatively to pinions 10e and 11e, said system comprising two sets of pinions 17 and 18 having the same number of teeth and loosely mounted relatively to each other, said pinion 17 meshing with a toothed gear 19 which is fixed relatively to the housing 12, and said pinion 18 meshing with an internal toothed gear 20 which controls the pitch indicator means. From the above description it will be clear that said gear 20 will rotate in one direction or the other through a number of revolutions proportional to the angle through which pinion 10e rotates relatively to said pinion 11e. This device will be used as an indicator of the blade pitch, movement of said gear 20 being transmitted to any suitable conventional indicator by any suitable conventional transmission means.

A set of pinions 10f and 11f having the same number of teeth as said pinions 10e and 11e is provided. This set of pinions has a different function in accordance with the invention. When said pinions are in gear the pinions of the other sets being out of gear, they compel gears 8 and 9 to rotate at the same speed, thus forming a locking means for the blade pitch control. This function could be discharged by pinions 10e and 11e of the blade pitch indicator means, if said pinions were provided with suitable clutch means.

It will be apparent to those skilled in the art that other sets of pinions could be provided in accordance with the invention of which the number of teeth could be such that the speeds of rotation of said gear 8 would differ more and more from those of said gear 9. Intermediate sets of pinions could also be intercalated between said aforementioned pinions and said gears so as to increase the gear ratio. Thus, instead of driving said gears 8 and 9 by a set of pinions for rapidly increasing the blade pitch, said set of pinions could be caused to drive said set of pinions for slowly increasing the blade pitch, said two sets of pinions being provided with selective means for throwing one set into gear when the other is out of gear. The errors of moduli or in the spacing of the spindles of said sets would thus be divided between the two sets instead of falling entirely on one, in the most unfavorable case.

The sets of pinions must of course be selectively thrown into and out of gear. This can be readily accomplished by providing each set with any suitable means to that end, an electro-magnetic clutch for example, and means such as a switch to control the current so as to throw the clutch of the one or the other set in or out. In any case said clutches will be so dimensioned that in case of excess coupling or the untimely operation of several clutches at once, the clutches shall slip and thus avoid damage. Such slip can occur without any risk, the relative speed of said pinions 10a and 11a, 10b and 11b . . . etc. being always very low.

Another object of the present invention is to provide a selective, mechanical clutch control which shall meet the following conditions:

1. The blade pitch locking pinions 10f and 11f should be slightly thrown out before throwing in any of the sets of pinions 10a, 11a; 10b, 11b . . . etc.;

2. Impossibility of throwing in more than one set of pinions at the same time;

3. Yielding operation of the clutch in case the teeth of a clutch should not happen to be in line with their receiving sockets, a situation which could exist for only a very short time on account of the constant angular displacement of the pinions in rotating;

4. Direct positive throwing out of the clutch without the intervention of any yielding means.

Said clutch control may be greatly simplified by the following considerations as regards security. If the slow and rapid increase of the blade pitch be thrown in simultaneously, the latter will prevail. Therefore it is only necessary to use ratchet claws or dogs. This applies equally to the rapid and the slow reduction of the blade pitch. The irreversibility or blade pitch locking may also be obtained by using a friction clutch with limited couple. It only remains therefore to provide the system of security between the increase and the decrease of the blade pitch. Better still, the decrease of the blade pitch requires but little effort and can therefore be effected by a friction clutch with a limited couple. Security is therefore really only indispensable between the slow and rapid increase and rapid decrease of the blade pitch.

The clutch control or operation is effected, in the illustrative embodiment of the invention, by a gear 21 provided with inclined cam slots 22a, 22b, 22c, 22d, and 22f of which the exact shape is shown in Fig. 3. Levers 23a, 23b, 23c, 23d and 23f see Figs. 3A to 3F inclusive engage said slots, each of said levers being fixedly secured upon a pivot shaft 70 to which one end of another lever 71 is also fixedly secured. The other end of the lever is connected to gear 24 by means of a link 72, said link having a slot 72a therein in which a stud 73 projecting from gear 24 fits. Gear 24 is movably mounted upon a sleeve 25 at one end of which is a shoulder 26 integral with the movable member of the clutch. A helical spring 27 is tensioned between said wheel 24 and said shoulder 26. Said gear 21 in rotating swings lever 23a to the right or to the left in Fig. 1. The movement to the right throws out the clutch 26a and is positive; that to the left throws the clutch in and is effected yieldingly through spring 27. Said cam slots 22a, 22b, 22c, 22d and 22f are so positioned on said gear 21 that for five positions of the latter, as shown in Figs. 3A to 3E inclusive, said cam slots produce the following combinations through the medium of levers 23a, 23b, 23c, 23d and 23f, and associated clutches:

1. Mean position, dead center:

10a, 11a  
   10b, 11b  
   10c, 11c  } thrown out.  
   10d, 11d 10f, 11f   thrown in.

2. Intermediate position at each side of mean position:

10b, 11b thrown in, all the others being thrown out; slow reduction of pitch.

10a, 11a thrown in, all the others being thrown out; slow increase of pitch.

3. Each end position:

10c, 11c thrown in, all others being thrown out; rapid increase of pitch.

10d, 11d thrown in, all others being thrown out; rapid decrease of pitch.

In Figs. 3A to 3E inclusive, the actual positions of the clutch levers 23a, 23b, 23c, 23d, and 23f, are shown in cross section, whereas the other positions of the clutch levers, when the gear 21 is shifted to the right or left, are indicated schematically by dots.

Said gear 21 is driven by gears 28 and 28a (see Fig. 2) which gears in turn are driven by a rack 29 when a slow or rapid increase in the blade pitch is being effected. In a similar manner, this same gear 21 is driven by gears 28' and 28a' which in turn are driven by a rack 29' (Fig. 11) when a slow or rapid decrease in blade pitch is being effected. The racks 29 and 29' may be driven by any suitable means, for example hydraulically or pneumatically by a set of fluid actuated pistons 30, 31, 30' and 31'. Compressed fluid may be supplied to said pistons from any suitable conventional source, not shown. Means are provided normally to maintain each of said racks in its median position, said means herein conveniently comprising a set of springs 32, 33 and 32', 33'. The mechanism for operating racks 29 and 29' mounted symmetrically in respect to a plane containing line A—B of Fig. 2 and vertical to the plane of said Fig. 2. These two mechanisms as previously stated are mechanically connected to the common gear 21 by gears 28, 28a and 28', 28a'. The parts of this symmetrical mechanism disposed on the left of line A—B (Fig. 2) are identical to those of the mechanism disposed to the right and are identified by the same reference characters as the latter but primed (see Fig 11). Suitable means 34 is provided for adjusting said rack both angularly and axially, as well as safety means, herein illustratively comprising a fork 35 rigidly united to a piston 36 actuated by any suitable means, preferably by fluid from the same source of supply as that above referred to, said piston being moved in one direction by said fluid pressure and in the other direction by an antagonistic spring 37. The rack at the right of Fig. 2 is part of the control for increasing the blade pitch, its counterpart at the left, being part of the control for decreasing the blade pitch. The selective mechanical operating mechanism above described operates as follows:

To increase the blade pitch slowly compressed fluid under medium pressure is admitted through a port 38 into the annular space between pistons 30 and 31 (Fig. 2). Piston 30 will thus be forced downwardly, carrying with it said rack 29. Rack 29 will then rotate pinions 28 and 28a which, in turn, will rotate the cam gear 21 through a partial revolution. Since the gear 21 also meshes with pinion 28a' (Fig. 11), it is evident that the rack 29' will be moved upwardly, thus compressing a spring 33' by operation of a piston 30'. When the bottom 39' of rack 29' contacts with the lower end of piston 31', movement of pistons 30 and 31' will be arrested, the fluid pressure being insufficient simultaneously to compress the three springs 33', 32 and 32'. Furthermore the safety device 35 being in engagement with adjusting means 34, arrests further movement of said rack 29. During the movement of the rack 29, the gear 21 and associated cam slots 22a, 22b, 22c, 22d, and 22f of gear 21 will be rotated through a partial revolution. When the movement of the rack is stopped by engaging the safety device 35, the cam ring will be disposed to the right of the mean position as shown in Fig. 3C, at which time the lever 23a will be disposed in the central portion of cam slot 22a to thereby permit the pinion 10a to be clutched to pinion 11a, at which time the remaining sets of pinions are unclutched. To effect rapid increase of the blade pitch, fluid under greater pressure is introduced through port 38. The fluid pressure thus obtained is sufficient on the one hand to counterbalance the action of spring 37 and raise piston 36, thus at the same time freeing adjusting means 34, and on the other hand to compress springs 33', 32 and 32'. Piston 30 can thus move between the corresponding position of contact of 39' with the end of piston 31' and the bottom of cylinder 40. During this last-named movement of rack 29, the cam slot gear 21 is rotated an additional amount in the same direction as in the preceding example, and at the limit of this movement the cam slots will occupy the positions relative to levers 22a, 22b, 22c, 22d and 22f, as shown in Fig. 3D. In the latter positions, the lever 23c is disposed centrally of slot 22c to thereby permit the associated pinions 10c and 11c to be clutched together while the remaining pinions are unclutched. It is thus seen that the set pinions 10a and 11a or the set 10c and 11c may be connected one at a time to impart different gear ratios between gears 8 and 9, which in turn will result in a corresponding difference in the rate of pitch change imparted to the propeller 3. The stroke of piston 30 or rack 29, and consequently of the angle of rotation of gear 21 are divided into two parts, one part corresponding to the travel from the mean position of equilibrium to the position wherein adjusting means 34 abuts against fork 35 or the bottom 39' of rack 29' contacts with the end of 31', for slowly increasing the blade pitch, and the other part corresponding to the travel from the latter position to that of contact between piston 30 and the bottom of cylinder 40, for rapidly increasing the blade pitch.

It will be noted by observing Figs. 2 and 11 that the mean positions of members 34, 34' are nearer the lower projections of stop members 35, 35' than to the upper projections of these same stop members; consequently, when the member 34 has moved downwardly (Fig. 2) into engagement with the lower projection of stop member 35, the corresponding member 34' will still be in spaced relation to the upper projection of stop member 35' (Fig. 11). When, however, increased pressure is introduced into port 38, the stop 35 will be raised, whereas stop 35' will remain stationary, after which racks 29 and 29' will be permitted to move until member 34' engages the upper projection of stop member 35'.

The slow as well as the rapid decrease of the blade pitch are obtained in the same manner by supplying said left side symmetrical mechanism (Fig. 11) with fluid under different degrees of pressure, the travel of the racks being reversed, as is also the rotation of the gear 21 relatively to the mean position.

The invention also comprises means for automatically limiting the feathering movement of the blades, high pitch front-high pitch back, low pitch, front-low pitch back and the like, which makes for great security and easy control of the position of the propeller. This means is operated preferably by the differential means for indicating the position of the blades, above described. In the illustrative embodiment of the invention shown, it comprises a gear 41 (see Figs. 1 and 10) centered in the housing 12 and operated by a toothed gear 42 integral with a further gear provided with dogs for clutching it to a toothed gear corresponding to wheel 20 of the differential means for indicating the blade pitch. Said gear 41 enables pinions 10a, 11a; 10b, 11b . . . etc., to be thrown out of gear in well defined positions. To this end said gear comprises adjustable dog 41a (Fig. 11) which, in its rotation are adapted to engage levers 43 which act directly upon said shoulder 26 and when operated throw the corresponding sets of pinions out of gear.

To render this operation more secure, pinion 10d, normally operated to feather the propeller blades, may have splined thereon a gear 44 (see Fig. 4) which is mounted upon the shaft of an electric motor 45 supplied with electricity from any suitable conventional source, from a battery for example. The propeller blades may thus be placed in feathered position, in the event of a complete stoppage of the driving engine. Normally however the last few turns of the engine before it stops completely should suffice to effect this operation.

Figure 8:
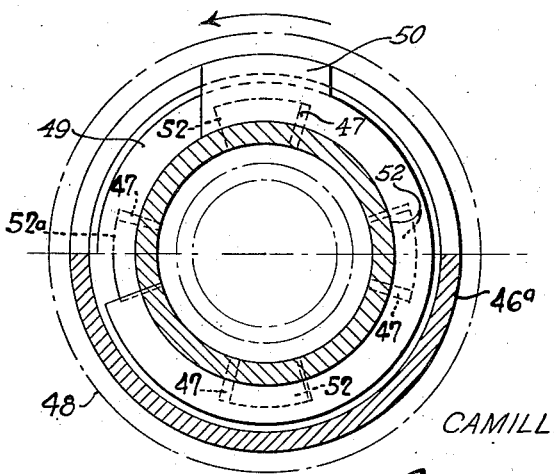

Instead of using the blade pitch locking means comprising the set of the two pinions 10f and 11f, one may use the following device illustrated in Figs. 5, 6, 7, 8 and 9 and which comprises in the illustrative embodiment of the invention, a channelled sleeve 46 mounted upon the shanks of worms 5 and to which is affixed a coaxial annular member 46a provided with slots 47 (see Figs. 6, 7, 8, 9); a housing 48 (see Fig. 5) is mounted upon members 46, 46a and is shaped to leave an annular space between it and said members and in which is lodged a spring 49, preferably a square-bar-spiral spring having one end forming a shoulder 50 lodged in a socket 51 in said sleeve 46a (see Fig. 5). Said spring is carried by the inner annular flange of said housing 48 and is under an initial tension. Said pinion 6 (see Figs. 1 and 5), which rotates said worm 5 by means of said sleeve 46 upon which it is splined, is provided with three dogs 52, and one dog 52a which dogs are adapted to engage said slots 47 (see Figs. 6, 7, 8, and 9) with a certain amount of play. The dog 52a is longer than the others and is adapted to engage the free end of said spring 49 (Fig. 8). Said channelled sleeve 46a has a number of channels 47 which is primary with the number of teeth or dogs 52, 52a of said pinion 6, thus providing for a very exact adjustment of the angular position of the blades relatively to the operating means.

The above-described arrangement enables said worms to be driven by said pinions 6 but absolutely precludes any transmission of movement from said worms to said pinions to decrease the blade pitch. As clearly appears from Fig. 7, worm 5 turning in the direction of the arrow, carries the sleeve 46, housing 46a and the end of said spring 49 along with it. Said spring under this traction and its initial tension is drawn out, binding still more on the inner annular part of said housing 48, its free end being free to move a distance equal to the play between the wall of said slot 47 and said dog 52. In view of the tightening of said spring, the great winding angle of the latter rapidly attains a point at which said spring becomes locked. On the contrary, when the transmission of movement is from said pinion 6 to said worm 5, that is to say when said worm is driven normally, said spring cannot cause the locking action referred to. Indeed, when said pinion drives said worm in the direction indicated by the arrow in Fig. 8, to pass from high pitch to low pitch, pinion 6 begins to move relatively to sleeve 46, through an angle corresponding to the play allowed between the wall of said slot 47 and said dog 52. In this movement the dog 52a of said pinion 6 presses upon the free end of said spring in the direction tending to unwind the latter, thus nullifying the initial tension of said spring when said dog 52 encounters the wall of the slot of said sleeve 46 in which it is engaged. Said sleeve as well as the no longer tensioned spring and said worm 5, on the shank of which said sleeve is splined, are all driven but said untensioned spring no longer exerts any locking or braking action on the inner annular portion of housing 48. For the change from low pitch to high pitch, said pinion 6 rotates in the direction indicated on Fig. 9 and the particular dog 52 engaging said particular slot 47 in said sleeve 46 abuts against the wall of said slot, said sleeve 46 being carried along by reason of the engagement of its end 50 in said socket 51. The force exerted upon said spring being in the direction tending to unwind it, the resistance opposed by said spring to said movement can never exceed that of its initial tension, which is negligible. The blade pitch locking device has herein been used only in the case of the reduction of the pitch, which is all that is required in practice, but it will be apparent that this locking feature could be applied in the case of the increase of the pitch as well as in the case of the decrease thereof, that is to say to effecting rotation in both directions, for example by using two springs wound in opposite directions and suitably driven by a member similar to said dog 52.

The present invention can be applied to any transmission using the different objects thereof.

I am aware that the present invention may be embodied in other specific forms without departing from the spirit or essential attributes thereof; and I therefore desire the present embodiments to be considered in all respects as illustrative and not restrictive, reference being had to the appended claims rather than to the foregoing description to indicate the scope of the invention.

I claim:

1. In an apparatus of the class described, means to be driven including a propeller of variable pitch, driving means for varying the pitch of said propeller including an engine drive shaft, speed changing means comprising a set of relatively rotatable pinions interposed in the driving connection between said drive shaft and propeller to increase the propeller pitch, a second set of relatively rotatable pinions interposed in the driving connection between said drive shaft and propeller for decreasing the propeller pitch, a control gear, cam means carried by said gear, means actuated by said cam means and operable upon the turning of said gear in one direction for causing said first set of pinions to rotate as a unit, means actuated by said cam means and operable upon the turning of said gear in the opposite direction for disconnecting said first set of pinions and for causing said second set of pinions to rotate as a unit, and alternately operable fluid actuated means for turning said gear in said opposed directions.

2. In an apparatus of the class described, means to be driven including a propeller of variable pitch, driving means for varying the pitch of said propeller including an engine drive shaft, speed changing means comprising a set of relatively rotatable pinions interposed in the driving connection between said drive shaft and propeller to increase the propeller pitch, a second set of relatively rotatable pinions interposed in the driving connection between said drive shaft and propeller for decreasing the propeller pitch, a control gear, means operable upon the turning of said gear in one direction for causing said first set of pinions to rotate as a unit, means operable upon the turning of said gear in the opposite direction for disconnecting said first set of pinions and for causing said second set of pinions to rotate as a unit, and means to move said gear including a pair of reciprocable racks and a compressed fluid actuated piston for actuating each of said racks, the movement of said racks being opposed relative to each other.

3. In an apparatus of the class described, means to be driven including a propeller of variable pitch, driving means for varying the pitch of said propeller including an engine drive shaft, speed changing means comprising a set of relatively rotatable pinions interposed in the driving connection between said drive shaft and propeller to increase the propeller pitch, a second set of relatively rotatable pinions interposed in the driving connection between said drive shaft and propeller for decreasing the propeller pitch, a control gear, means operable upon the turning of said gear in one direction for causing said first set of pinions to rotate as a unit, means operable upon the turning of said gear in the opposite direction for disconnecting said first set of pinions and for causing said second set of pinions to rotate as a unit, means to move said gear including racks and a compressed fluid actuated piston for actuating each of said racks, the movement of said racks being opposed relative to each other, stop means for limiting the travel of said racks under said fluid pressure, and means responsive to a predetermined high fluid pressure for rendering said stop means ineffective.

4. In an apparatus of the class described, means to be driven including a propeller of variable pitch, driving means for varying the pitch of said propeller including an engine drive shaft, at least two driving connections between said shaft and said propeller, speed changing means comprising a set of relatively rotatable coaxial pinions interposed in each of said connections, a clutch between each set of pinions, a control gear, means for clutching-in one of said clutches when said gear is rotated in one direction and for clutching-in the other of said clutches when said gear is rotated in the opposite direction, a reciprocable rack for imparting rotation to said gear in one direction, and a second reciprocable rack for imparting rotation to said gear in the opposite direction.

5. In a motion transmitting apparatus, means to be driven including a propeller of variable pitch, a gear fixedly mounted on the base of said propeller, a worm meshing with said gear, a worm shaft, an engine drive shaft, a train of gears connecting said worm shaft with said drive shaft, a spiral spring, a fixed drum upon which said spring is frictionally wound, means connecting said spring with said worm shaft to provide a friction force resisting the driving force from said worm shaft, and spring unwinding mean operable upon the turning of the gears in said train in one direction for relieving the frictional engagement of said spring with said drum, whereby said propeller may be driven by said train, and whereby said propeller will be prevented from driving said train.

CAMILLE DUCHAUSSOY.